Figure 1:
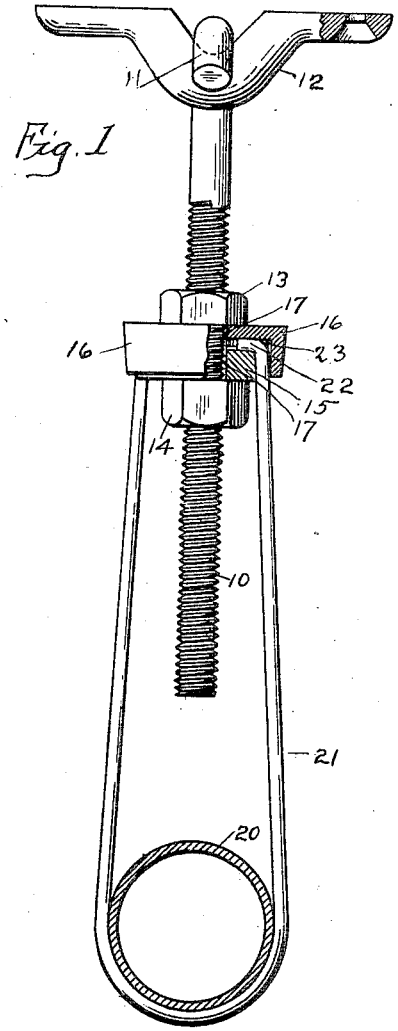

E. H. ROBERTS.
PIPE HANGER.
APPLICATION FILED JAN. 8, 1910.

971,077.

Patented Sept. 27, 1910.

WITNESSES:
S. W. Atherton.
Ernst P. Nold

INVENTOR
Elmer H. Roberts
BY A. M. Wooster
ATTORNEY

UNITED STATES PATENT OFFICE.

ELMER H. ROBERTS, OF NORWALK, CONNECTICUT.

PIPE-HANGER.

971,077. Specification of Letters Patent. Patented Sept. 27, 1910.

Application filed January 8, 1910. Serial No. 536,973.

*To all whom it may concern:*

Be it known that I, ELMER H. ROBERTS, a citizen of the United States, residing at Norwalk, county of Fairfield, State of Connecticut, have invented an Improvement in Pipe-Hangers, of which the following is a specification.

This invention has for its object to produce a pipe hanger adapted for general use and especially adapted for supporting steam and hot water pipes, which shall be so constructed as to permit the hanger to be put up either before or after the pipe is hung, which shall be vertically adjustable for the purpose of maintaining the alinement of the pipe and which shall be free to swing in the longitudinal direction of the pipe as the latter expands and contracts, thus making my novel hanger especially valuable for supporting long lines of steam pipe.

With these and other objects in view I have devised the novel hanger which I will now describe, referring to the accompanying drawing forming a part of this specification and using reference characters to indicate the several parts.

Figure 2:
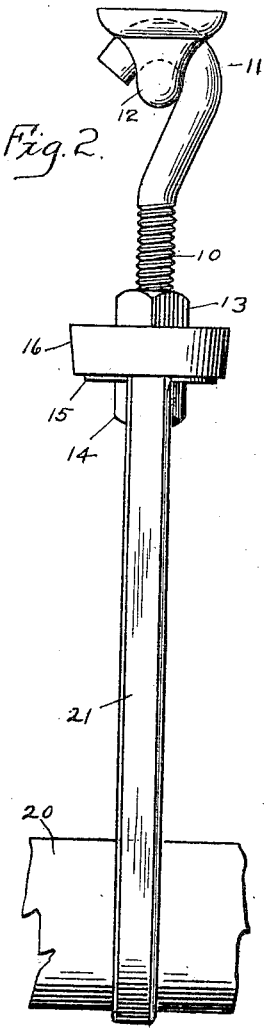
Figure 3:
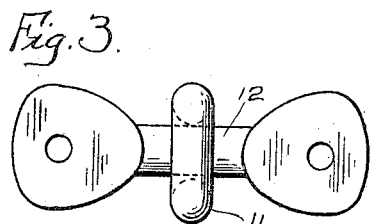

Figure 1 is an elevation of my novel hanger partly broken away to show the construction and also showing a pipe in section; Fig. 2 an elevation from a point of view at right angles to the point of view in Fig. 1; Fig. 3 a plan view of the holder detached showing the hook in engagement therewith; and Fig. 4 is a view of the block detached.

10 denotes a threaded shank which may be suspended from the ceiling in any ordinary or preferred manner. I have shown the shank as provided with a hook 11 which is adapted to engage a suitable holder 12 which is attached to the ceiling. This holder may be an eye or a curved loop, as shown in the drawing. Upon the shank are upper and lower nuts indicated respectively by 13 and 14 and between the nuts are a sliding block 15 and a sliding cap 16, both block and cap being provided with central openings indicated by 17 which are unthreaded and receive the shank freely. The block is provided with side recesses 18 lying opposite to each other and top recesses 19 which lead into the side recesses and into the central opening.

Figure 4:
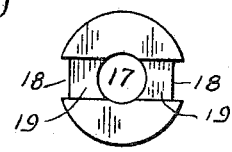

The pipe, indicated by 20, is supported by a spring loop 21, the upper ends of which lie in the side recesses in the block and are provided with inwardly turned ends 22 (one only being shown) which engage the top recesses in the block, (see Fig. 1 in connection with Fig. 4). The top recesses may be dispensed with if preferred but are preferably used in order to increase the rigidity of the hanger leaving it to swing freely on the hook. The cap is provided with a recess 23 which receives the block and the upper ends of the spring loop.

The operation will be readily understood from the drawing.

The hook swings freely in the holder. It is wholly immaterial whether the hanger is put up before or after the pipe is hung. In adjusting the hanger to a pipe, the nuts are separated on the shank, the hanger placed about the pipe as shown in the drawing, the upper ends of the hanger are pressed inward and placed in engagement with the recesses in the block, the cap being raised for the purpose; then the cap is allowed to drop to place; then the lower nut is turned upward on the shank against the block to give the required alinement to the pipe, and then the upper nut is turned downward against the cap to lock the parts of the hanger rigidly in place. Should adjustment of the pipe be required at any time to preserve its alinement, the nut on the side corresponding with the direction in which the pipe is to be moved is loosened and the pipe is moved in the direction required by turning the other nut against it, after which the hanger is locked in place to retain the pipe in its new position by turning the loosened nut against it.

Having thus described my invention I claim:

A pipe hanger comprising a threaded shank, a supporting block provided with intersecting top and side recesses, a loop having its ends bent over to fit within said intersecting recesses, a cap having a depending flange fitting down over the side recesses in said block, said block and cap being free to slide on said shank, a nut on said shank for adjustably supporting said cap and block, and a second nut on said shank coöperating with the first nut to clamp the cap and block together.

In testimony whereof I affix my signature in presence of two witnesses.

ELMER H. ROBERTS.

Witnesses:
WM. H. RAYMOND, Jr.,
HERBERT O. POLLARD.